Nov. 21, 1939.    I. SAKS    2,180,746

CLUTCH DISK

Filed March 15, 1937

INVENTOR.
Ira Saks.
BY Fay, Oberlin & Fay
ATTORNEYS.

Patented Nov. 21, 1939

2,180,746

UNITED STATES PATENT OFFICE 2,180,746

CLUTCH DISK

Ira Saks, Shaker Heights, Ohio

Application March 15, 1937, Serial No. 130,873

3 Claims. (Cl. 192—107)

The present invention relates to a new and improved form of construction for a clutch disk particularly adapted for use in clutch assemblies for internal combustion engines. Such a clutch disk is carried by the driven shaft of a clutch assembly and functions as the engaging element with the driving members such as the pressure plate and fly wheel.

In other words, the clutch disk operates as a cushion element which is alternately engaged and disengaged between two flat surfaces. Friction facing rings, which are in and of themselves inelastic and not capable of any bending or distortion during operation, are carried by the clutch disk and provide the contacting surfaces thereof. Since it is desirable to have a certain amount of cushioning action in the clutch disk, during its engagement and disengagement with the driving elements, such action is obtained by distortion of the body of the disk.

It is therefore the general object and nature of my invention to provide a clutch disc construction wherein the relatively brittle, inelastic facing rings are enabled to retain a flat and undistorted position during the operation of the disk, and wherein the entire cushioning action is taken up by the disk proper and not transmitted to the facing rings. My invention also comprises a new and improved method of forming offset sectors in the clutch disk whereby the terminal ends of the sectors are maintained in their desired position in the plane of the body of the disk while the offsetting deformation of the remainder of such sectors is accomplished, so that such deformation does not distort or displace such terminal ends.

Briefly outlined, my invention includes a disk having a series of flat sectors, all lying in the plane of the body of the disk and to which one of the facing rings is attached; and a series of offset sectors or tongues, which are all offset in one direction with respect to the body of the disk and with the other facing ring secured only to the high points of these offset sectors, so that movement of the facing rings toward and away from each other is absorbed entirely by the bowed sectors without bending any portion of the facing rings or setting up any distorting stresses in the latter.

To the accomplishment of the foregoing and related ends, said invention, then, consists of the means hereinafter fully described and particularly pointed out in the claims.

The annexed drawing and the following description sets forth in detail certain means and one mode of carrying out the invention, such disclosed means and mode illustrating, however, but one of various ways in which the principle of the invention may be used.

Figure 1:
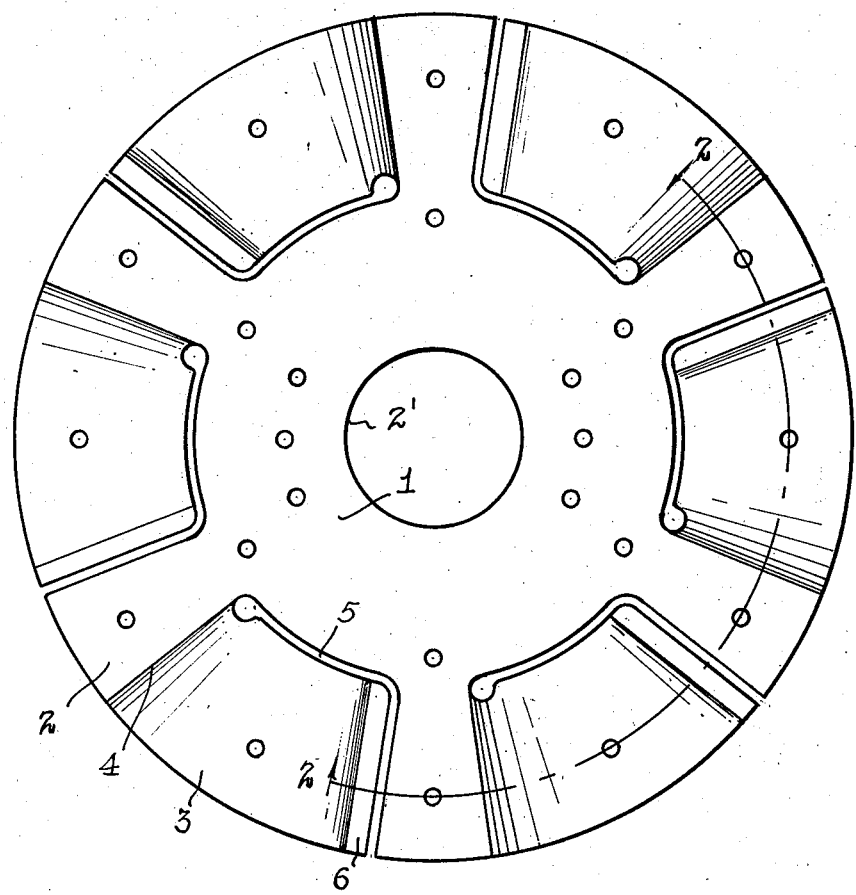
Figure 2:
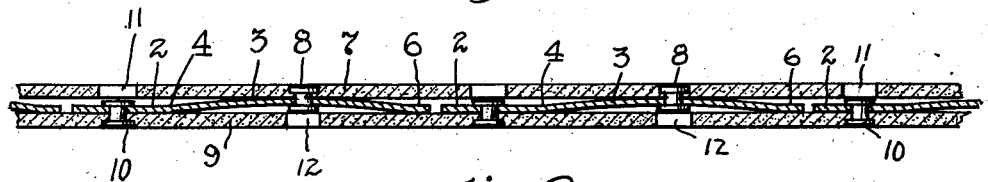
Figure 3:
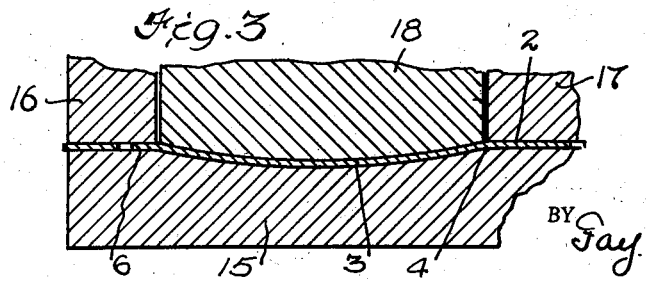

In said annexed drawing:

Fig. 1 is a plan view of a clutch disk, with friction facing rings removed, embodying the principle of my invention; and Fig. 2 is a developed sectional view, with friction facing rings attached, and taken substantially along the arcuate line 2—2 of Fig. 1; Fig. 3 is a sectional view through a forming die illustrating the method of forming the sectors in the clutch disk.

Now referring more particularly to the drawing, there is shown therein a clutch disk of circular shape, having the body portion 1 and the central opening 2' for a hub mounting. A series of flat sectors 2, joined to the body 1 and lying in the same plane therewith is located around the periphery of the disk. Laterally offset bowed sectors or tongues 3 are contiguous with the flat sectors 2, as indicated along the line 4. The bowed sectors 3 are separated from the body of the disk 1 along their inner arcuate line and also along a radial line by substantially L-shaped slots 5. The free end of the tongues 3, that is the end opposite to the end which is joined with the flat sectors 2, is flattened for a short distance, as indicated at 6. The flattened portion 6 lies in the same plane as that of the flat sectors 2.

All of the bowed sectors 3 are offset in the same direction from the body of the disk 1, or in other words, they are all bowed on the same side of the disk. A friction facing ring 7 is secured to the highest points, or points of the bowed sectors 3 which are farthest away from the body of the disk 1 by suitable rivets 8. A friction facing ring 9 is secured to the flat sectors 2 by means of the rivets 10. Registered openings 11 and 12 are provided in the friction facing rings 7 and 9 respectively in order to receive the projecting heads of the rivets 8 and 10, when the disk is in flattened or engaged position.

It will thus be seen that the friction facing rings 7 and 9 at all times present flat surfaces to the clutch disk engaging elements such as the pressure plate and flywheel (the latter of course not being shown). On flattening of the disk, or upon its engagement the bowed sectors 3 are forced into the plane of the flat sectors 2 and of the body of the disk 1. The flattened portion 6 on the free end of the bowed sectors 3 serve as bearing and guiding points for the bowed sectors when the latter are flexed into and out of the plane of the disk, thus eliminating any sharp edges which might cut into or injure the inner sides of the facing rings.

The clutch disk is assembled with the facing ring 9 attached to the flat sectors 2 on the fly wheel side. The facing ring 9, being normally contiguous to the plane of the body of the disk 1 has very little, if any, axial movement with respect to that plane upon engagement and compression of the clutch disk, whereas the facing ring 7, attached to the offset sectors 3, has a relatively greater axial movement. Thus by assembling the facing ring 9 on the fly wheel side, the relatively axially fixed facing ring, upon engagement of the clutch parts, contacts with the axially fixed clutch element (the fly wheel), and the relatively axially movable facing ring contacts with the axially movable clutch element (the pressure plate).

The facing ring 7 attached to the offset sectors 3 is contacted by the pressure plate, and as compression between the pressure plate and fly wheel increases, the area of contact of the facing ring 7 with the clutch disk 1 correspondingly increases during the flattening out of the offset sectors 3, until complete surface to surface contact is had between not only the facing ring 7, but also the facing ring 9 when the clutch disk is in fully compressed and engaged position.

Smoother engaging and disengaging operation of the clutch disk is thus obtainable by reason of my above described construction; and a longer life and freedom from breakage of the facing rings due to the absence of any bending or distorting stresses being set up in them result.

The method of forming the above described offset sectors 3 is as follows:

The sector 3, which originally is in a flat condition and disposed in the plane of the body of the disk, is placed in a forming die 15 having a convex contour corresponding to the final form of the offset sector. The terminal ends of the offset sector 3, viz., the free end 6 and the juncture end which joins the flat sectors 2 along the joining line 4 are held in the plane of the disk by the holding dies or "pressure pads" 16 and 17. The male forming die 18 is then forced downwardly against the die 15 to place the bowed offset in the intermediate portion of the offset sector 3. In this manner, the terminal ends 6 of the offset sectors 3 are maintained in proper position during the deforming operation, and the flat sectors 2 are also maintained in proper alignment in the plane of the body of the disk 1 and are not subjected to any undesired distortion or displacement.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A clutch disk comprising the combination of a single disk body and friction facing rings mounted on both sides of said body, the latter having a series of alternate at and bowed sectors extending to the outer edge of said disk and formed in pairs contiguous to each other along a radial line, said bowed sectors being bowed all in the same direction with respect to said disk, and flat end portions on said bowed sectors lying in the plane of said disk body.

2. A clutch disk comprising the combination of a single disk body and friction facing rings mounted on both sides of said body, the latter having a series of alternate flat and bowed sectors extending to the outer edge of said disk and formed in pairs contiguous to each other along a radial line, said bowed sectors being bowed all in the same direction with respect to said disk, and flat end portions on said bowed sectors lying in the plane of said disk body, one of said rings being attached to said flat sectors only and the other of said rings being attached to said bowed sectors only.

3. A clutch disk comprising the combination of a single disk body and friction facing rings mounted on both sides of said body, the latter having a series of flat sectors and arcuately bowed sectors radially contiguous with said flat sectors, and separated by an L-shaped slot along a radial and circumferential side from said disk body, all of said bowed sectors being offset on one and the same side of said disk body, and flat portions on the free ends of said bowed sectors adjacent the radial portion of said L-slots, said flat portions being disposed in the plane of the body of said disk, one of said rings being attached to said flat sectors only and the other of said rings being attached to said bowed sectors only.

IRA SAKS.